F. J. COLE.
WATER SEPARATOR FOR LOCOMOTIVE CYLINDERS.
APPLICATION FILED JULY 3, 1919.
1,324,339.
Patented Dec. 9, 1919.
4 SHEETS—SHEET 1.
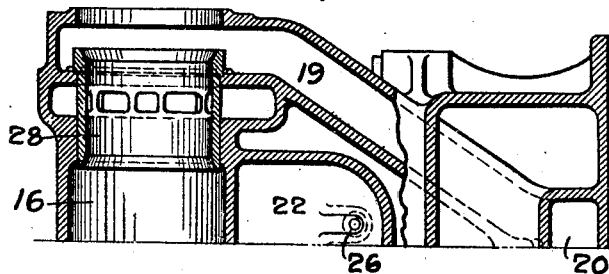
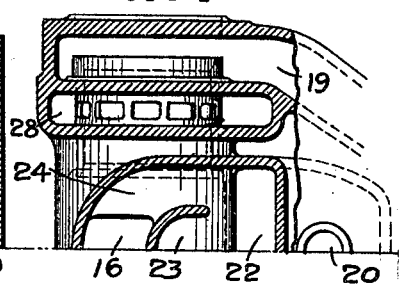
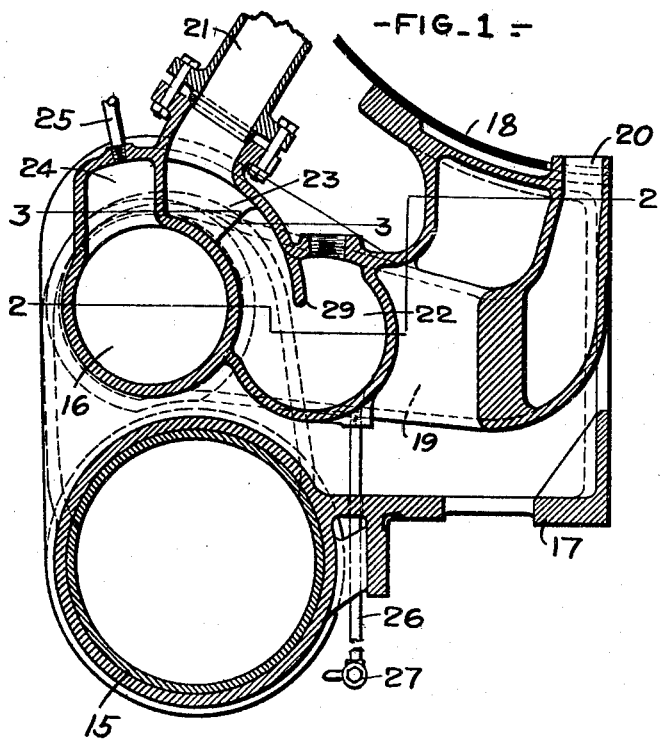
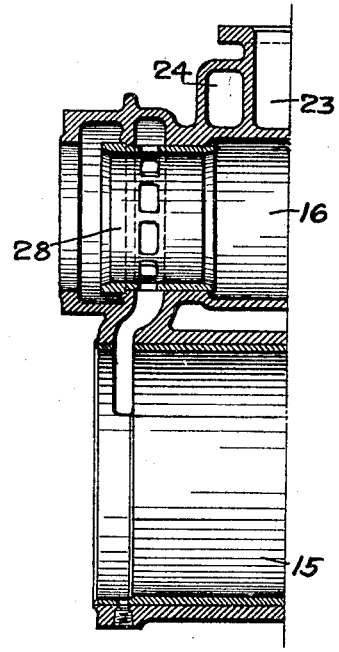
INVENTOR
Francis J. Cole.
by Edward H. Wright
Atty.

F. J. COLE.
WATER SEPARATOR FOR LOCOMOTIVE CYLINDERS.
APPLICATION FILED JULY 3, 1919.
1,324,339.
Patented Dec. 9, 1919.
4 SHEETS—SHEET 2.
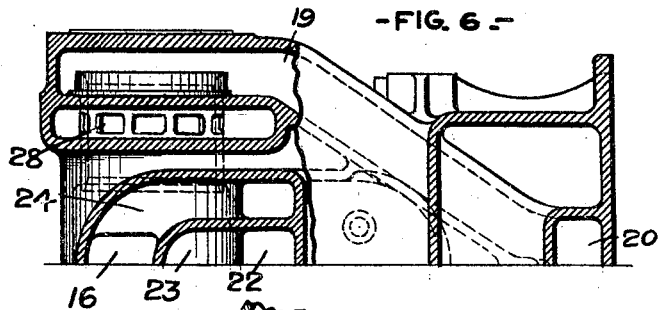
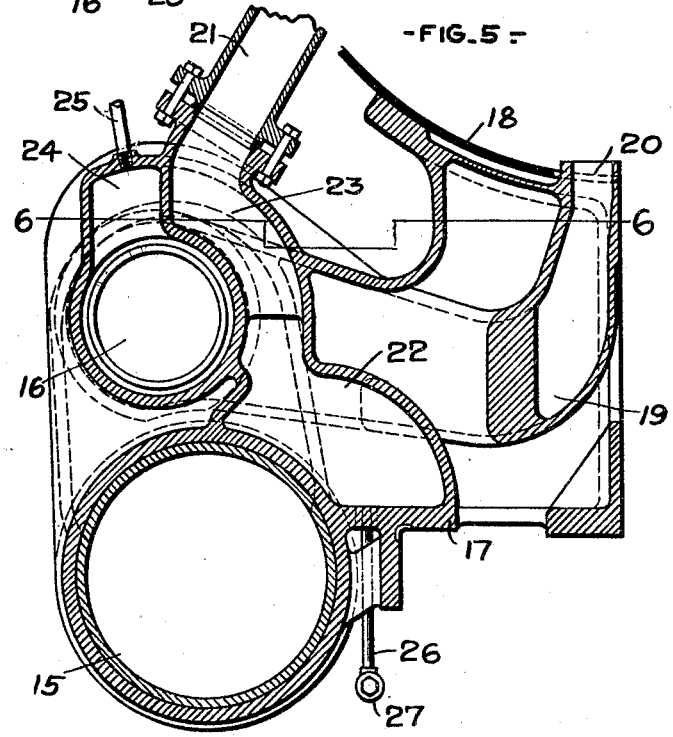
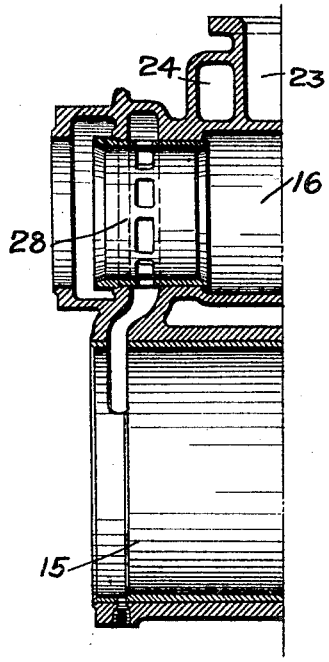
INVENTOR
Francis J. Cole
by Edward H. Wright
Atty.

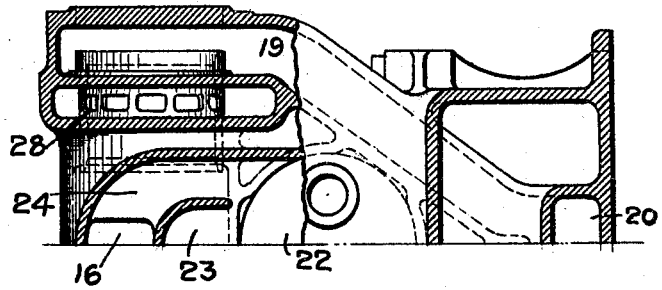
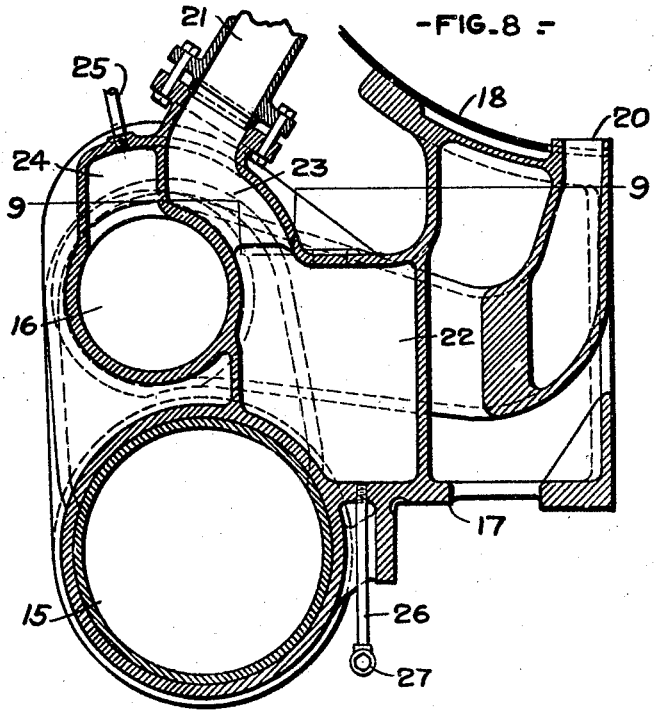
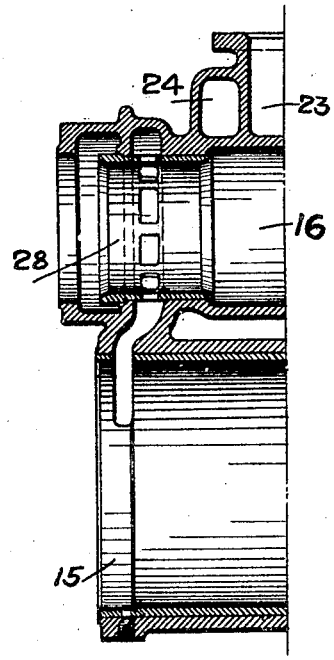

F. J. COLE.
WATER SEPARATOR FOR LOCOMOTIVE CYLINDERS.
APPLICATION FILED JULY 3, 1919.
1,324,339.
Patented Dec. 9, 1919.
4 SHEETS—SHEET 4.
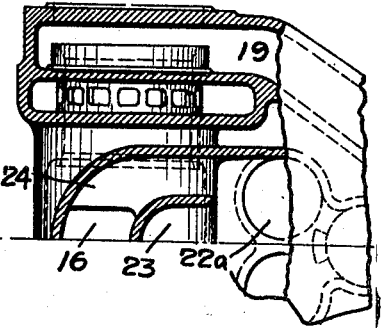
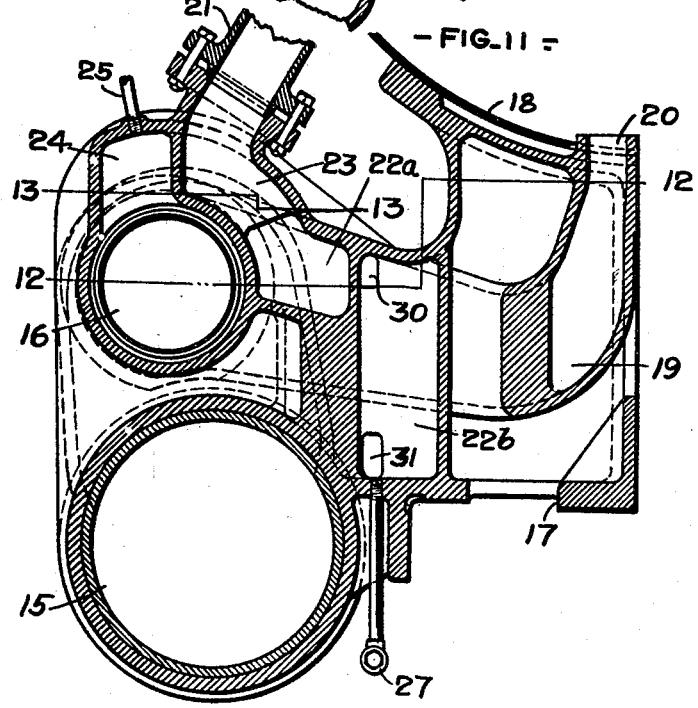
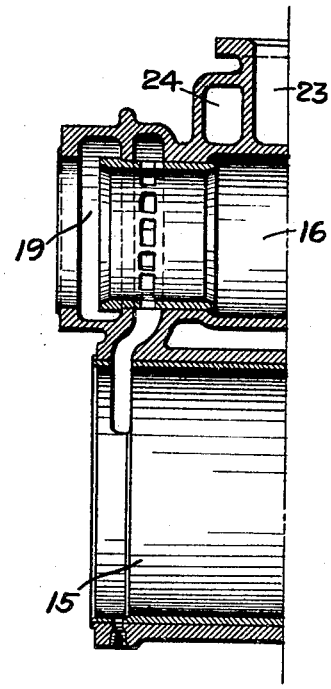
INVENTOR
Francis J. Cole.
by Edward H. Wright.
Atty

UNITED STATES PATENT OFFICE.

FRANCIS J. COLE, OF SCHENECTADY, NEW YORK.

WATER-SEPARATOR FOR LOCOMOTIVE-CYLINDERS.

1,324,339.  Specification of Letters Patent.  Patented Dec. 9, 1919.

Application filed July 3, 1919. Serial No. 308,591.

*To all whom it may concern:*

Be it known that I, FRANCIS J. COLE, of Schenectady, in the county of Schenectady and State of New York, have invented a certain new and useful Improvement in Water-Separators for Locomotive-Cylinders, of which improvement the following is a specification.

My invention relates to means for eliminating water from the live steam before the same is admitted to the cylinders of locomotive engines.

With large modern locomotives, owing to clearance conditions, the dome is necessarily made lower than formerly, thus bringing the throttle valves nearer the water in the boiler, so that in cases of high water, foaming, and for other reasons, more water is carried over with the steam into the engine cylinders than was formerly the case with smaller locomotives. This greatly increases the danger of breakage of the cylinder, and also the liability of producing very destructive shocks to certain parts of the machinery, such as the crank pins, axles, piston rods, piston heads, frames, etc.

The object of my invention is to provide improved means for separating and collecting the water carried over by the live steam before it is carried into the steam chest, and before the oil is introduced into the steam for lubricating the valves and pistons. Generally stated, my improvement comprises a separating and collecting chamber located in close proximity to the locomotive cylinder, preferably formed integral with the cylinder casting and having an inlet passage communicating with the live steam supply pipe and an outlet passage leading to the steam chest of the valve chamber, where the lubricating oil is introduced.

In the accompanying drawings: Figure 1 is a transverse section of one form of cylinder casting at one side of the locomotive, and embodying my improvement; Fig. 2, a horizontal section of the same, taken substantially on line 2—2 of Fig. 1; Fig. 3, a horizontal section taken on the line 3—3 of Fig. 1; Fig. 4, a vertical longitudinal section of one half the cylinder and steam chest; Fig. 5, a transverse sectional view, similar to Fig. 1, but showing a modified form of water collecting chamber; Fig. 6, a horizontal section taken substantially on the line 6—6 of Fig. 5; Fig. 7, a vertical longitudinal section of the same; Figs. 8, 9, and 10, views similar to Figs. 5, 6 and 7, respectively, but showing another modification; and Figs. 11, 12, 13, and 14, views similar to Figs. 1, 2, 3 and 4, respectively, but showing still another modification.

Referring to the construction shown in Figs. 1 to 4, the cylinder casting is similar, in its general shape and outline, to the standard form heretofore used, and including the engine cylinder, 15, the steam chest, 16, of the valve chamber, and the body or saddle portion, 17, extending to the center of the locomotive, and supporting the shell, 18, of the smoke box of the boiler. The valve chamber is provided with the usual bushings, 28, for the piston valves, (not shown), and exhaust passages, 19, are also formed in the casting, and lead from the outer ends of the valve chamber to the exhaust nozzle, 20, discharging into the smoke box. The live steam supply pipe, 21, as shown, is of the outside type, leading downward through an opening in the smoke box shell in the usual manner.

According to my improvement, a water collecting chamber, 22, is provided in close proximity to the locomotive cylinder, and preferably formed integral with the cylinder casting. As shown, said water collecting chamber is formed in the casting at the inner side of the steam chest of the valve chamber, and between the two exhaust passages, 19, and is provided with an inlet passage, or channel, 23, communicating with the steam supply pipe, 21, and one or more outlet passages, 24, leading from the upper portion of said chamber to the top of the steam chest, 16, said passages also being formed in the one integral casting. The oil pipe, 25, is connected to feed the oil from the lubricator into the live steam, preferably at the point that the passage, 24, communicates with the top of the steam chest, and after the water which was contained in the live steam has been deposited in said collecting chamber. For draining off the water accumulating in the chamber, 22, there is a pipe, 26, leading to a drain valve, 27, which may be operated in any suitable manner, for instance, by means of the usual cylinder cock mechanism, or the pipe, 26, may be extended to the cab, and the valve operated by hand to blow out said chamber and give an indication of the discharge of water therefrom.

When the throttle is open, live steam flowing through the live steam pipe will pass down through the inlet passage, 23, into the separating chamber, 22, where the water contained in said steam will be deposited, and will accumulate in the bottom of said chamber, the live steam then passing upward through the chamber, 24, to the upper portion of the steam chest. At this point, lubricating oil is introduced by means of pipe, 25, for lubricating the valves and pistons in the valve chamber and engine cylinder. Any suitable form of deflector, such as the curved plate, 29, may be employed at the lower end of the inlet passage, 23, for assisting in separating the water and directing the same toward the bottom of the chamber.

The water collecting chamber may be formed in various shapes and locations, in accordance with my invention. As shown in the modification illustrated in Figs. 5, 6, and 7, said chamber extends down to the bottom, 17, of the body portion of the casting at the inner side of the engine cylinder, while its end walls extend to and may be formed integral with the walls of the exhaust channels, 19. The partition forming the wall between the inlet passage, 23, and outlet passage, 24, also extends lower down around the inner wall of the steam chest. In the modification shown in Figs. 8, 9, and 10, the water collecting chamber is in the form of a vertical cylinder, having its walls formed integral with the shells of the steam chest and the engine cylinder, and also the walls of the exhaust passages, 19.

According to the modification shown in Figs. 11, 12, 13, and 14, the water collecting chamber is formed in two compartments, 22$^a$, and 22$^b$, the former communicating with the steam inlet and outlet passages, 23 and 24, and the compartments being connected together by openings, 30 and 31, top and bottom.

In all of these constructions, the live steam flows downward from the supply pipe through the inlet passage, 23, into the upper portion of the separating and collecting chamber, 22, at which point the current of steam is diverted, passing around the lower edge of the walls of the inlet passage, and up through passages, 24, to the top of the steam chest, 16. The water contained in the steam naturally continues downward as it enters the separating chamber, and accumulates in the bottom thereof. All water that has accumulated in any pockets in the steam supply pipe during the time that the steam is shut off, also drains down into the water collecting chamber, and is thereby prevented from passing over into the valve chest and cylinder.

After the water has been separated from the steam, the lubricating oil is introduced into the same, preferably at the point that the steam is admitted to the steam chest of the valve chamber, so that the oil is then carried by the steam directly to the parts to be lubricated.

My improvement is particularly designed for use in connection with the modern type of locomotive cylinder having the outside steam supply pipe connection, that is, when the live steam pipe leads through the side of the shell of the smoke box above the cylinder casting, and is connected to the top of the steam chest. With this construction, the space in the cylinder casting between the exhaust passages, which space was formerly taken up by the live steam supply passages, is free to be occupied by the water collecting chamber, and provided an adequate volume for this purpose.

My improvement also has the advantages that it involves no moving parts; has no joints to leak; and adds but little to the weight and cost of the cylinder castings.

Having now described my invention, what I claim as new and desire to secure by Letters Patent is:

1. The combination with a locomotive cylinder, steam chest, and live steam supply pipe, of a water collecting chamber located close to said cylinder and having an inlet passage communicating with said steam supply pipe, and an outlet passage leading to said steam chest.

2. The combination with a locomotive cylinder, steam chest, and live steam supply pipe, of a water collecting chamber located close to said cylinder and having an inlet passage communicating with said steam supply pipe and an outlet passage leading to said steam chest, and means for feeding lubricating oil into said live steam after the water is deposited.

3. The combination with a locomotive cylinder, steam chest, and live steam supply pipe, of a water collecting chamber formed integral with said cylinder, and having an inlet passage communicating with the steam supply pipe and an outlet passage leading to said steam chest.

4. The combination with a locomotive cylinder, steam chest, and live steam supply pipe, of a water collecting chamber formed integral with said cylinder, and having an inlet passage communicating with the steam supply pipe and an outlet passage leading to said steam chest, and an oil feed pipe connected to said outlet passage.

5. The combination with a locomotive cylinder, steam chest, and live steam supply pipe, of a water collecting chamber formed integral with said cylinder, and having an inlet passage communicating with the steam supply pipe and an outlet passage leading to said steam chest, and a drain pipe and valve connected to the bottom of said chamber.

6. The combination with a locomotive cylinder casting including a steam chest and valve chamber, of a live steam supply pipe, and a water collecting chamber also formed integral with the cylinder casting and having an inlet passage communicating with the steam supply pipe and an outlet passage leading to said steam chest.

7. A locomotive cylinder casting including the engine cylinder, the steam chest, a water collecting chamber, a live steam pipe connection, a passage leading from said steam pipe connection downward into said chamber, and a passage from the upper portion of said chamber to the top of the steam chest.

8. The combination with a locomotive cylinder steam chest, and an outside live steam supply pipe, of a water collecting chamber located below the steam supply pipe and at the inner side of the steam chest, and having a passage communicating with the supply pipe, and another passage leading to the upper portion of the steam chest.

9. The combination with a locomotive cylinder, a steam chest and valve chamber having exhaust passages at its opposite ends, of a water collecting chamber located at the inner side of the steam chest and between said exhaust passages, a live steam supply passage leading into said chamber, and a passage leading from the upper portion of said chamber to the steam chest.

10. The combination with a locomotive cylinder, a steam chest with piston valve chambers having exhaust passages at opposite ends, and an outside live steam supply pipe, of a water collecting chamber located below the supply pipe at the inner side of the steam chest and between said exhaust passages, said chamber having an inlet passage communicating with said live steam supply pipe, and another passage leading to said steam chest.

In testimony whereof I have hereunto set my hand.

FRANCIS J. COLE.

Witnesses:
CHAS. L. WICK,
JOHN K. COGAN.